Nov. 18, 1941.   G. BROWN ET AL   2,262,830
MULTIPLE LIGHT SOURCE LAMP
Filed Aug. 11, 1939   4 Sheets-Sheet 1

Inventors
George Brown
Merle Chamberlin
By Lyon & Lyon
Attorneys

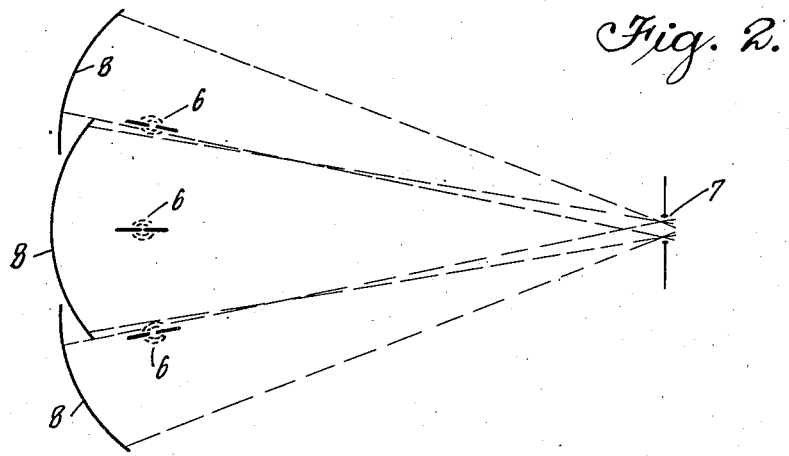
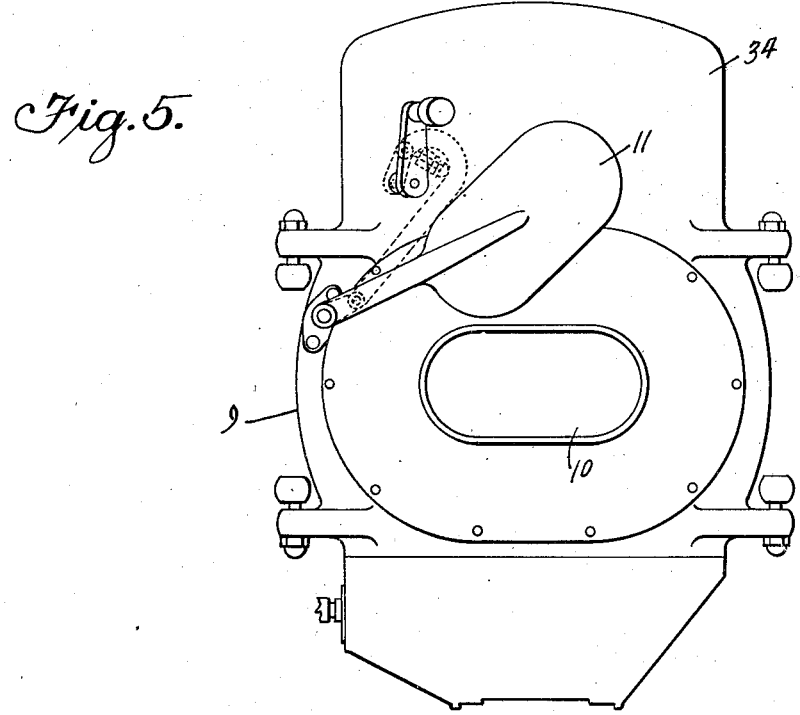

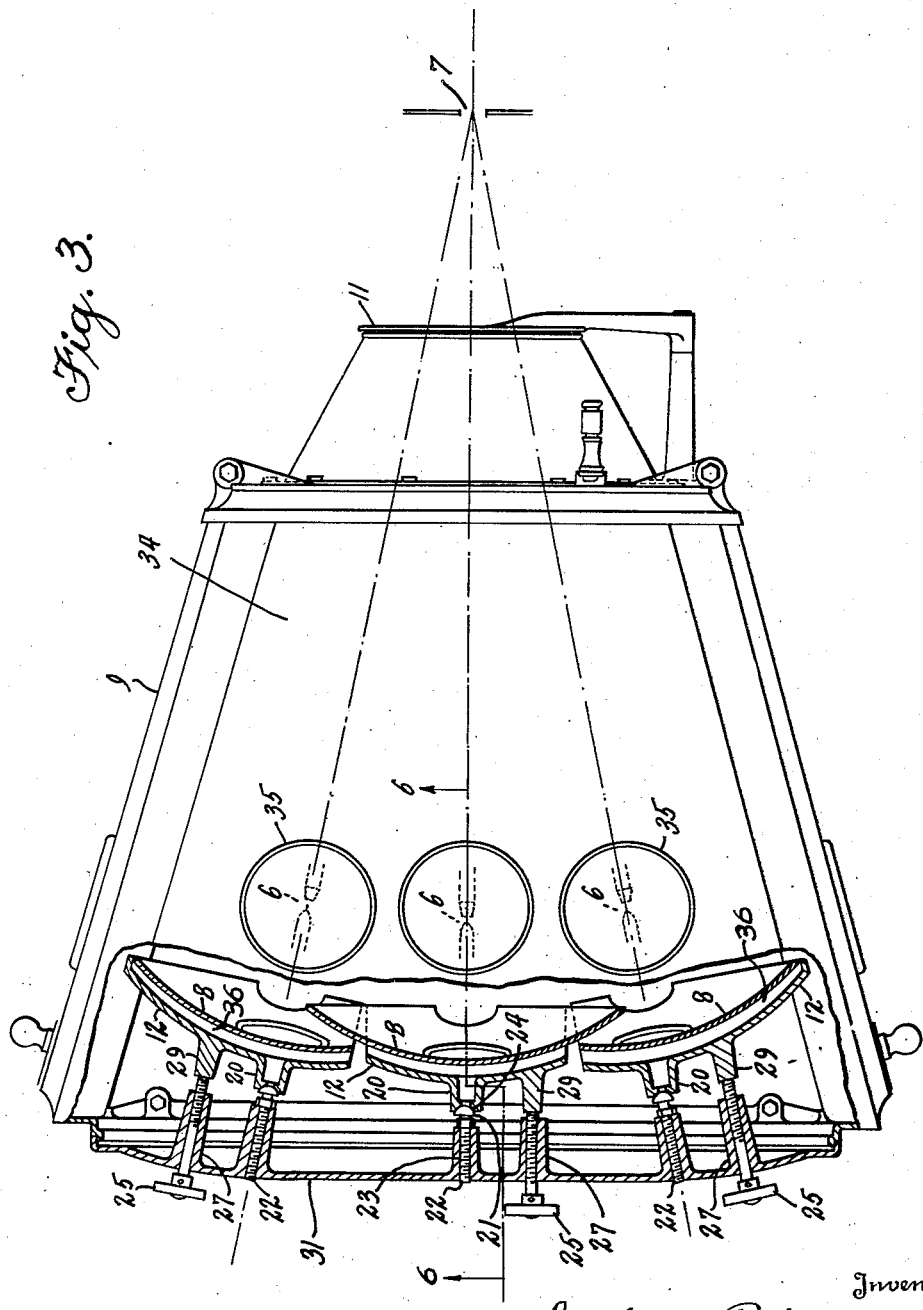

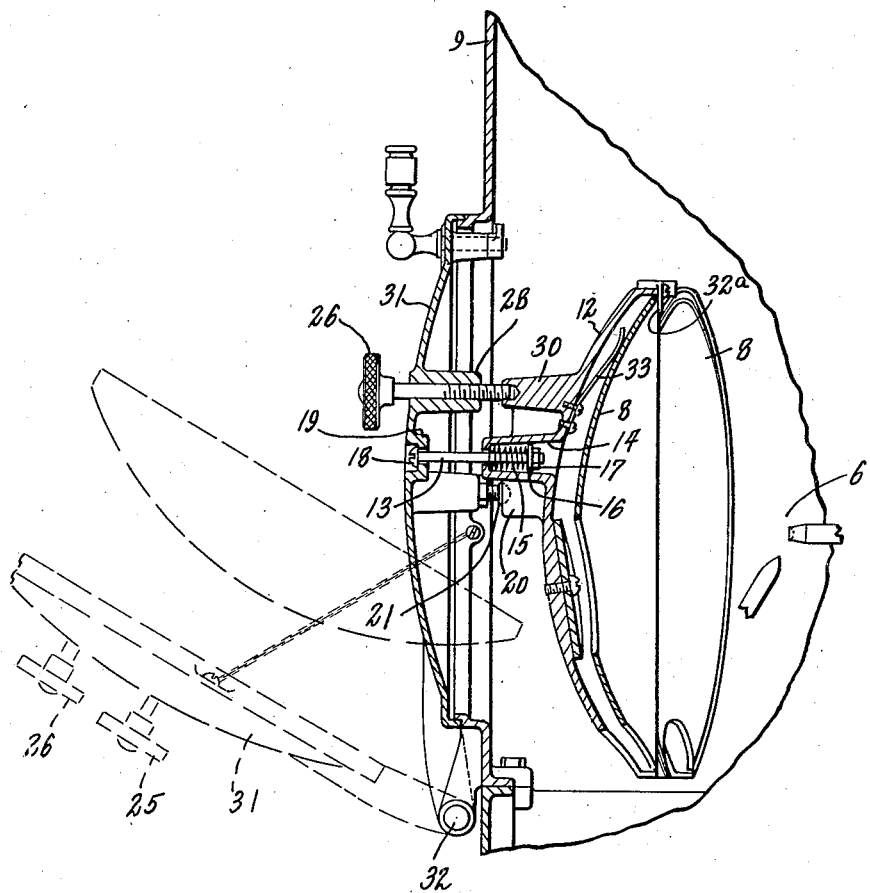

Patented Nov. 18, 1941

2,262,830

UNITED STATES PATENT OFFICE 2,262,830

MULTIPLE LIGHT SOURCE LAMP

George Brown, Palms, and Merle Chamberlin, Los Angeles, Calif., assignors to Loew's Incorporated, New York, N. Y., a corporation of Delaware Application August 11, 1939, Serial No. 289,556

2 Claims. (Cl. 240—3)

This invention relates to multiple light source lamps, and more particularly to a multiple light source lamp as adapted for use in projection of light to provide for the substantially uniform light distribution over a required area.

In the projection of the light required for the exhibition of motion pictures, and particularly as such pictures are projected in the projective background process of composite photography, there has long existed in the art the problem of obtaining substantially uniform light distribution. This problem has for a long period of time presented two well recognized difficulties; first, in that there is ordinarily produced upon the projection screen what is commonly referred to as a "hot spot" or center area of greatest light intensity, and second, where multiple light projection or multiple projection has been attempted, there has been found to exist upon the screen shadows or areas of light of non-uniform intensity, or what we choose to refer to as "light confusion" in the area of overlapping or matching of the multiple projected light.

The projective background method of composite photography has for a long period of time played an important part in motion picture production. The use of this method, however, has been restricted because no practical solution of the problem of uniform light projection has heretofore been found or suggested.

We have discovered a practical solution of this problem through the use of a multiple light source lamp wherein the projection of light is derived from a multiple source and directed through a single projection aperture wherein the multiple light source lamp includes a plurality of light sources and a plurality of overlapping reflectors or light-directing members so arranged with reference to the said light sources and to the aperture as to enable us to obtain substantially uniform light projection and distribution over the entire area of projection while avoiding the formation of areas of light confusion or shadows.

It is therefore an object of our invention to provide a multiple light source lamp particularly applicable for use in projection which includes multiple light sources arranged with reference to light directing members, and to a projection aperture in such manner as to avoid the formation of areas of light confusion or shadows over the projected light area.

Another object of our invention is to provide a multiple light source lamp including multiple sources of light, a multiplicity of overlapping light reflectors, and a single projection aperture so arranged as to distribute the light from said sources and reflectors through the projection aperture so as to produce substantially uniform light projection upon the projection area.

Another object of our invention is to provide a multiple light source lamp including a plurality of light sources, a plurality of reflecting members including one reflecting member for each light source, and a single projection aperture wherein the light sources and reflectors are so positioned with reference to each other as to avoid light confusion from one source upon the reflectors for another source, and wherein the reflectors and light sources are so positioned as to enable direction of substantially uniform light intensity over the area of the projection aperture.

Another object of our invention is to provide a multiple light source lamp including a single projection aperture, a multiplicity of light sources, and a multiplicity of reflector members wherein means are provided for adjusting the position of the light projectors and light sources so as to permit a variation of the direction of projection of the light as it is projected from the light sources.

Another object of our invention is to produce a multiple light source lamp including a single projection aperture, a multiplicity of light sources and a multiplicity of reflectors so arranged as to be particularly applicable for use in the projection of motion pictures in the projective background method of composite photography.

Other objects and advantages of this invention it is believed will be apparent from the following detailed description of a preferred embodiment thereof as illustrated in the accompanying drawings.

In the drawings:

Figure 2 is a diagrammatic view of a multiple light source lamp embodying our invention.

Figure 3 is a sectional plan view of a multiple light source lamp embodying our invention.

Figure 5 is a front elevation thereof.

Figure 6 is a sectional view taken substantially on the line 6—6 of Figure 3.

In the preferred embodiment of our invention as illustrated in the accompanying drawings, we have more or less diagrammatically illustrated the structure embodying our invention for the purpose of illustrating the same as it is particularly applicable for use in connection with a projective background process of composite photography. It will, however, be obvious to those skilled in the art that our invention is not limited to this particular use, but that the multiple light source lamp embodying our invention is particularly applicable for use in any connection where substantially uniform light distribution is desired or required, and is also particularly applicable for other photographic processes and in connection with projectors used for other purposes.

Figure 1:
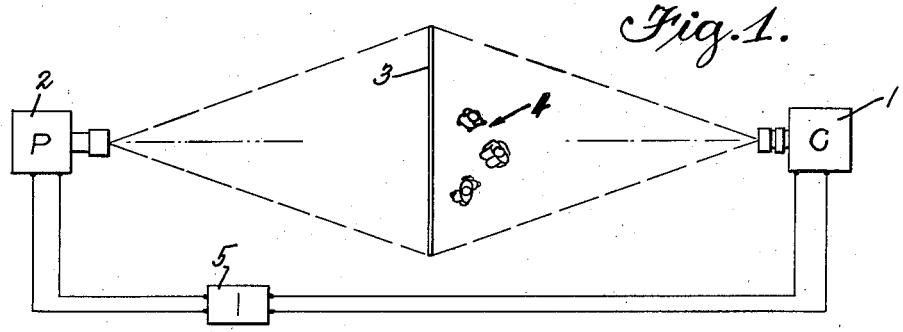
Figure 1 is a diagrammatic view illustrating the projective background method of composite photography incorporating a multiple light source lamp embodying our invention.

In the particular application illustrated, we have diagrammatically shown in Figure 1 the projective background process wherein there is employed the camera 1 and a projector 2 between which there is interposed a projection screen 3. In this process of composite photography, the background is formed by projection in the projector 2 and the action, or actors, are generally positioned between the screen 3 and the camera 1, as indicated at 4.

The operation of the camera 1 and the projector 2 is controlled usually through an electrical interlock as diagrammatically indicated at 5 to insure simultaneous projection and exposure of the films in the projector 2 and camera 1.

In this process the effectiveness of the background as photographed to a considerable degree depends upon the uniform distribution of the projected scene upon the screen 3 and the problems in this regard become greatly amplified in the use of color photography which is quite sensitive to light variations over the set being photographed.

The multiple light source lamp embodying our invention is diagrammatically illustrated in Figure 2 wherein the relationship of the multiple light sources 6 to the single light aperture 7 and reflectors 8 is diagrammatically illustrated. It will be observed from Figure 2 that the multiple light sources 6 are positioned with reference to the reflectors 8 and the light aperture 7 in such manner as to avoid light confusion from the multiple light sources and the reflectors as the light is directed to and through the aperture 7. It will also be observed that the reflectors 8 are positioned and mounted in overlapping relation so that the problem of matching the edges of such reflectors is overcome without producing shadows on the reflected screen surface as the light is passed through the aperture 7. By the arrangement as illustrated, each of the light sources 6 is positioned in substantially the focal point of the reflectors 8 and the reflectors 8 as illustrated are of the parabolic or other similar form wherein the light as reflected from the reflecting surfaces converges toward the aperture 7. The particular curvature or formation of the reflectors 8 may be considerably varied from that illustrated and of course such variation in curvature or shape of the reflectors will vary the positioning of the light sources 6. With the reflectors as thus positioned, the light from each source 6 may be separately directed through the aperture 7 so that the central portions of the reflected beam of light from each of the reflectors 8 pass through the aperture 7 at different points or at different angles so that the centers or points of greatest intensity of the light when falling upon a screen or surface to be lighted are spread over that surface and not concentrated at a single point. By positioning the reflectors 8 so that they may be individually adjusted in position, the points of maximum light intensity of each reflected beam of light from each source 6 may be positioned upon the light-receiving surface or screen at the points desired, to enable us to obtain substantially uniform light distribution over the entire surface.

It will also be observed that the position of the reflectors 8 and light sources 6 is such with relation to the single light aperture 7, that the reflected light from said reflectors 8 passes through the aperture 7 as a narrow and concentrated light beam near the point of convergence of the respective light beams.

The multiple light source lamp embodying our invention as the same is diagrammatically illustrated, includes a light housing 9 having a front or forward light opening 10 which, as is customary in such lamps, may be controlled through the medium of a suitable shutter 11.

Mounted within the lamp housing 9 in any suitable or desirable manner, as will be well understood in the art, are the multiple light sources 6, herein indicated as being of the arc form, but which obviously may be of any other suitable or desirable form of incandescent lamps.

Mounted within the housing 9 so as to be universally adjustable are the reflectors 8 which likewise may be of any suitable or desirable construction and of any desired form or curvature. The reflectors 8 are mounted so as to be universally adjustable in the construction as herein illustrated as by having the reflector carriers 12 supported in the housing 9 by means of bolts 13 which pass through substantially cylindrical bolt housings 14 formed on the carriers 12. The bolts 13 yieldably hold the carriers 12 by means of springs 15 which at one end engage the end of the bolt carriers 14 and at their opposite end are engaged by the washers 16 adjustably positioned by means of nuts 17 on the bolts 13. The bolts 13 are provided with screw heads 18 and pass freely through openings 19 formed in the housing 9.

The springs 15, thus provided, yieldably urge the carriers 12 into position with relation to ball and socket supports 20 around which said carriers 12 and reflectors 8 may be freely rotated in any direction to effect their adjustment as desired. The ball and socket supports 20 include ball members 21 carried at the end of adjustment screws 22 threaded in the housing 9 as indicated at 23. The ball members 21 are engaged with sockets 24 formed at the rear of the carriers 12. The threading of the screws 22 in the housing 9 permits the adjustment of the reflectors 8 to and from the light sources 6. This is permitted because of the yieldable support provided by the spring 15 and bolt 13. Thus by threading the screw 22 in or out, the reflectors 8 may be moved to or from their respective light sources 6.

Means are provided for rotating the carriers 12 and reflectors 8 about the ball members 21 as centers of rotation, which means include the horizontal plane reflector adjusting members 25 and the vertical plane adjusting members 26. The adjusting members 25 and 26 include adjusting screws which are threaded in bosses 27 and 28, respectively, of the housing 9. The horizontal adjusting screw 25 engages a bearing boss 29 carried by the carriage 12 so that by relative adjustment of the screw 25 in the boss 27 the reflector 8 may be adjusted in a horizontal plane.

The adjusting screw 26 is correspondingly operatively connected with an adjusting stud 30 carried by the carriage 12 so that as the screw 26 is threaded in or out of its boss 28 the position of the reflectors 8 may be adjusted in a vertical plane. Thus it will be observed that by proper adjustment of the universal mounting of the reflectors 8, the reflected beam of light therefrom may be adjusted to pass through the single aperture 7 in any desired position, or at any desired angularity with reference to the plane of the aperture so as to position the reflected beams of light at the desired point of the aperture 7 to completely cover the screen or area upon which the said beams of light fall. Thus in projective background composite photography, if it is desired to stronger illuminate one section of the background for any reason by simple adjustment of the reflectors 8, the light therefrom may be so adjusted that greater intensity of light may be had at the desired point. It will also be apparent that as the points of greatest intensity of the light may be spread or positioned at any point desired, that any point of low light intensity upon the screen 3 may be immediately corrected by the adjustment of the universal mounting of the reflectors 8.

As herein illustrated, the universal mounting for the carriages 12 and the reflectors 8 is carried by a rear door 31 of the housing 9, which door is pivotally mounted as indicated at 32 so as to permit the easy withdrawal of the reflectors 8 from the housing 9 for any desired purpose.

Figure 4:
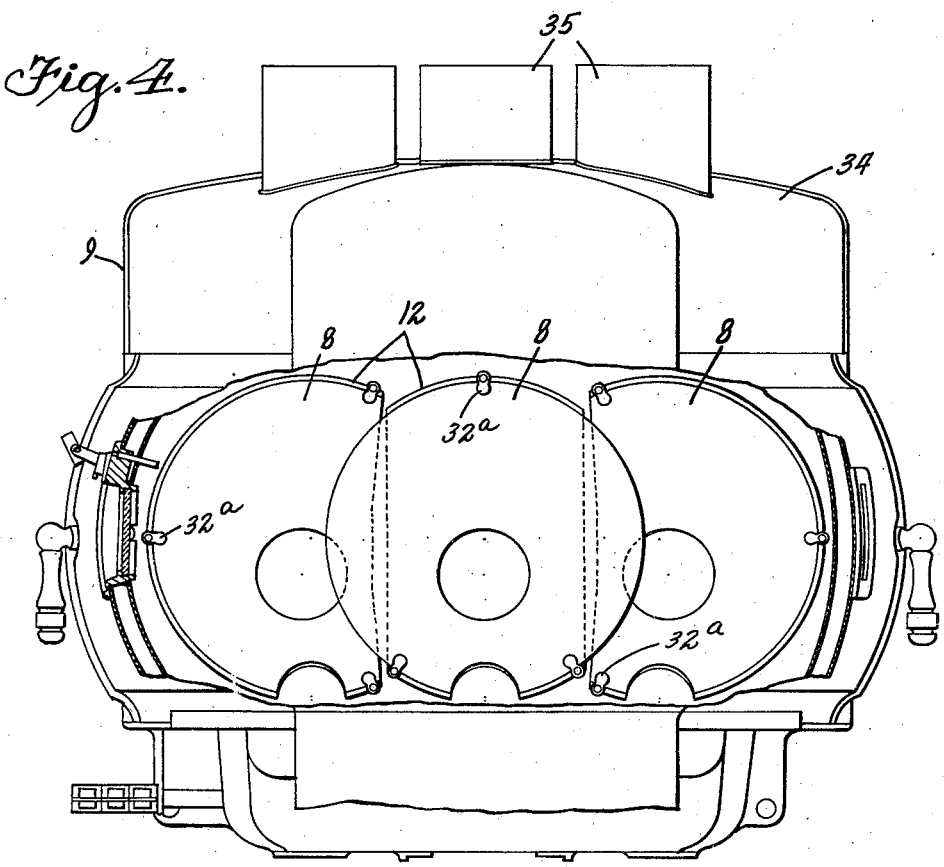
Figure 4 is a sectional elevation thereof.

As will be apparent from Figures 4 and 6, reflectors 8 are mounted in the carriages 12 by means of a plurality of holding clips 32ª which act to clamp or hold the reflectors 8 against spring members 33 which are interposed between the carriage 12 and the rear of the reflectors 8. As is customary in such lamps, the housing 9 is provided with a cover 34 having heat-dispensing vents 35 through which the heat developed from the light sources may be dispersed.

Any suitable form of reflector may be employed and in the form we have illustrated, it will be noted that the reflectors 8 are carried in spaced relation from their carriages 12 so as to permit air cooling of the reflectors by the free passage of air through the spaces 36 intervening between the carriages 12 and the reflectors 8.

Having fully described our invention and its application to one particular use, it is understood that our invention is not limited to the details as herein disclosed or to the particular use illustrated, but is of the full scope of the appended claims.

We claim:

1. A light projecting device comprising a housing having a single light emitting aperture, a plurality of light sources mounted within said housing, a light converging reflector for each light source having its focal point substantially at the light source, independent adjustable mounting means for each reflector for selecting the point at which the reflected beam of light passes through said light emitting aperture, said reflectors overlapping one another at their adjacent edges for producing substantially uniform light distribution with all adjustments of said mounting means.

2. A light projecting device comprising a housing having a single light emitting aperture, a plurality of light sources mounted within said housing, a light converging reflector for each light source having its focal point substantially at the light source, universally independent adjustable mounting means for each reflector for selecting the point at which said reflected beam of light passes through said light emitting aperture, the said reflectors overlapping one another at their adjacent edges for producing substantially uniform light distribution with all adjustments of said mounting means.

GEORGE BROWN.
MERLE CHAMBERLIN.